(12) United States Patent
Matsumoto

(10) Patent No.: US 7,538,315 B2
(45) Date of Patent: May 26, 2009

(54) IMAGE FORMING APPARATUS AND CONTROL METHOD THEREFOR

(75) Inventor: Yuzo Matsumoto, Abiko (JP)

(73) Assignee: Canon Kabushiki Kaisha (JP)

( * ) Notice: Subject to any disclaimer, the term of this patent is extended or adjusted under 35 U.S.C. 154(b) by 276 days.

(21) Appl. No.: 11/466,094

(22) Filed: Aug. 21, 2006

(65) Prior Publication Data
US 2007/0047085 A1 Mar. 1, 2007

(30) Foreign Application Priority Data
Aug. 31, 2005 (JP) ............................. 2005-252721

(51) Int. Cl.
*G06F 7/00* (2006.01)
*H01J 5/16* (2006.01)
(52) U.S. Cl. ................... 250/236; 347/231; 347/250
(58) Field of Classification Search ......... 250/234–236; 358/480, 497; 347/231, 250
See application file for complete search history.

(56) References Cited

U.S. PATENT DOCUMENTS

| | | | |
|---|---|---|---|
| 5,264,945 A | 11/1993 | Kannegundla et al. | |
| 5,677,724 A | 10/1997 | Takizawa et al. | |
| 5,793,181 A * | 8/1998 | Ozaki et al. | 318/807 |
| 5,811,795 A | 9/1998 | Boutet | |
| 5,963,240 A * | 10/1999 | Shinohara et al. | 347/116 |
| 6,816,269 B1 | 11/2004 | Loce et al. | |
| 7,034,859 B2 | 4/2006 | Ishihara et al. | |
| 2003/0020801 A1* | 1/2003 | Yamaguchi et al. | 347/259 |
| 2004/0169715 A1* | 9/2004 | Rauch | 347/241 |
| 2004/0179087 A1* | 9/2004 | Yoshizawa et al. | 347/232 |

FOREIGN PATENT DOCUMENTS

| | | |
|---|---|---|
| EP | 0 271 052 A2 | 6/1988 |
| EP | 0 674 422 A2 | 9/1995 |
| JP | 2002-236400 A | 8/2002 |
| JP | 2002-311358 A | 10/2002 |
| JP | 2005-104063 | 4/2005 |
| RU | 2257601 A | 7/2005 |

OTHER PUBLICATIONS

Office Action issued in corresponding Russian application No. 2006-13101/09(034014), dated Dec. 3, 2007.
Relevant portion of Extended European Search Report of corresponding European Application No. 06119459.3-2202, with dated Dec. 21, 2006.
Decision of Grant issued in corresponding Russian application No. 2006-131301, dated Apr. 14, 2008.

* cited by examiner

*Primary Examiner*—John R Lee
(74) *Attorney, Agent, or Firm*—Rossi, Kimms & McDowell LLP

(57) ABSTRACT

This invention makes it possible to prevent any uneven density and degradation in resolution in reciprocal laser scanning using a movable mirror. An image forming apparatus forms an image on a photosensitive member by scanning the photosensitive member with a laser beam reflected by a movable mirror with reciprocating the movable mirror whose rotation angle is changeable in accordance with an electrical signal. The apparatus detects the rotation direction of the movable mirror, and weights, on the basis of the rotation direction, image data of two lines along the sub-scanning direction in correspondence with the ratio of the scanning length after the start of laser write for a line of laser scanning to compensate the image to be formed using the movable mirror.

4 Claims, 13 Drawing Sheets

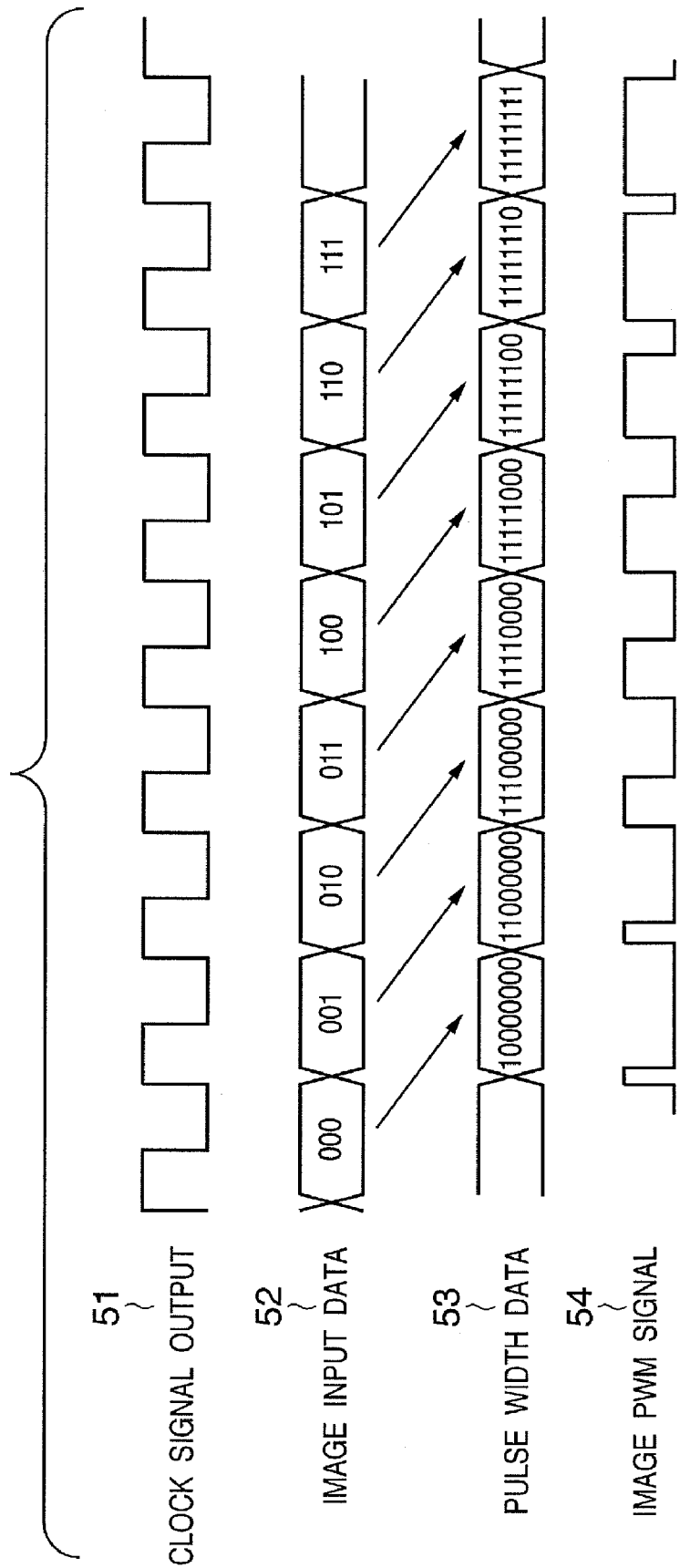

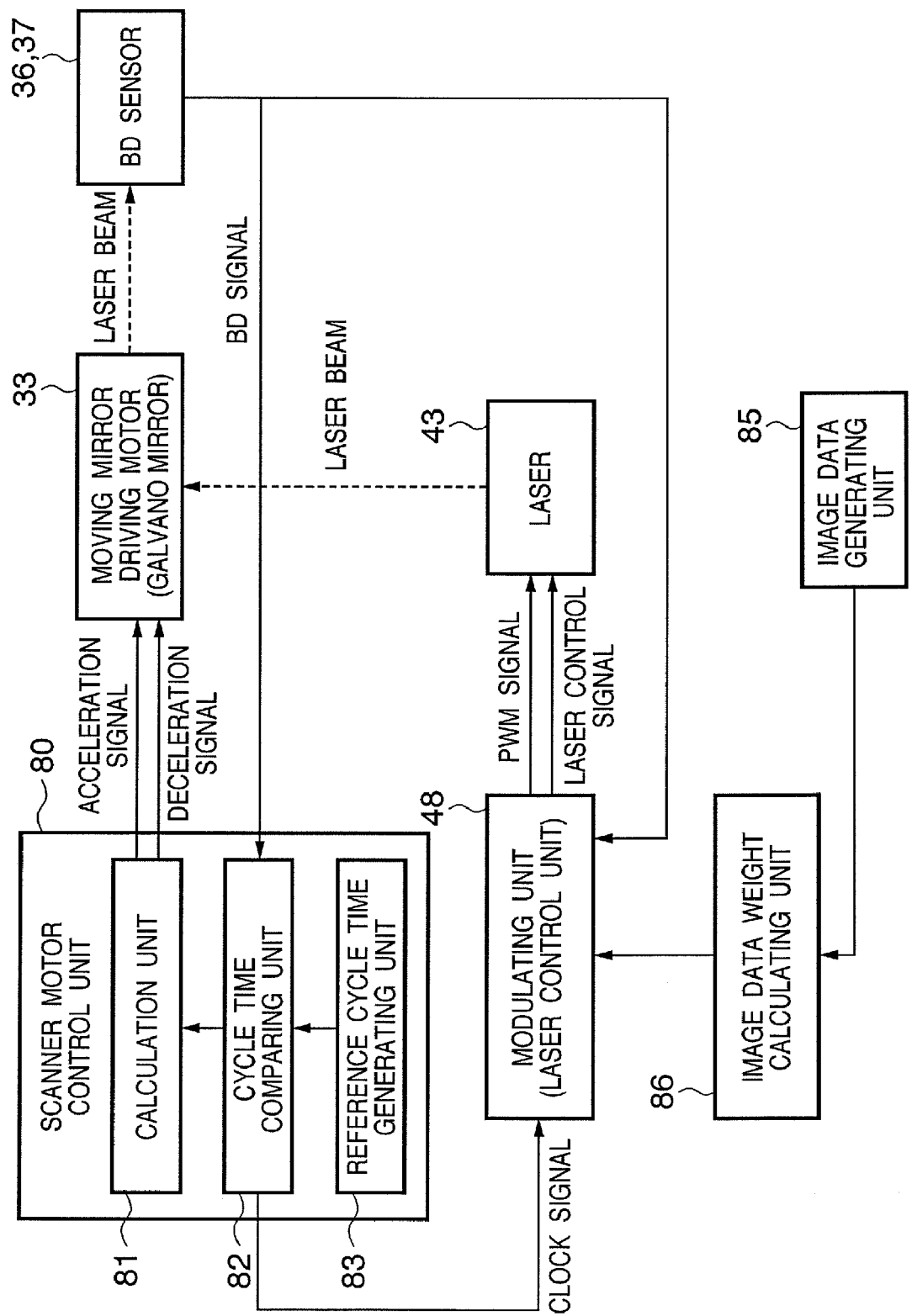

FIG. 9
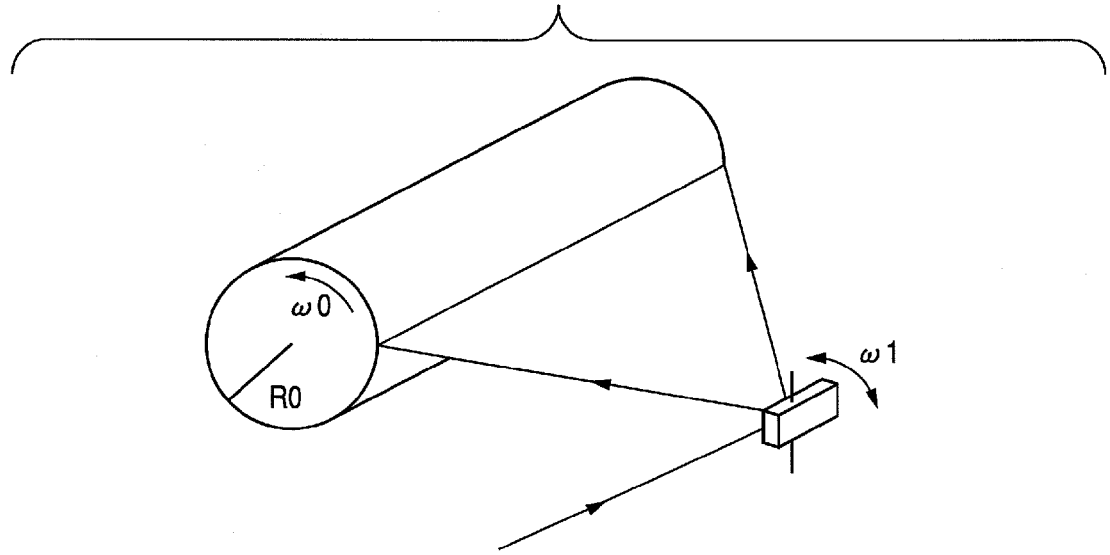
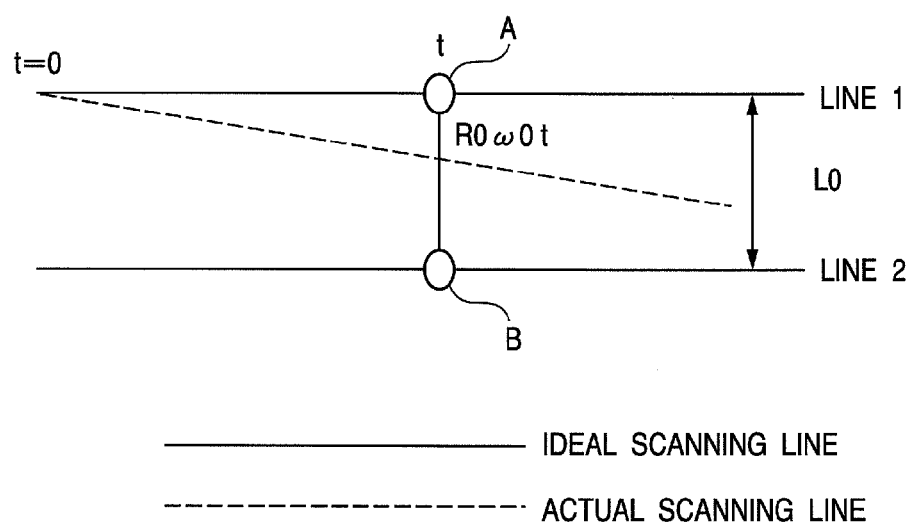
—————————— IDEAL SCANNING LINE
------------ ACTUAL SCANNING LINE

IMAGE FORMING APPARATUS AND CONTROL METHOD THEREFOR

BACKGROUND OF THE INVENTION

1. Field of the Invention

The present invention relates to an image forming apparatus and control method therefor and, more particularly, to an image forming apparatus which is suitable for a copying machine, laser beam printer, and facsimile and designed to irradiate an electrostatic medium with a modulated laser beam from a laser beam source to form, on its surface, image information which contains, e.g., electrostatic latent images, and a control method therefor.

2. Description of the Related Art

Conventionally, for image formation, such an image forming apparatus causes a motor to rotate a polygon mirror and detects the scanning position of a laser beam reflected by that polygon mirror to determine the scanning start position in the main scanning direction. That is, to detect the scanning position of the laser beam, a laser beam detecting sensor (to be referred to as a BD sensor hereinafter) is disposed in a non-image area. The BD sensor is irradiated with a laser beam to cause output of a laser beam detection signal (to be referred to as a BD signal hereinafter). The apparatus determines the image write start position on the basis of the resultant BD signal, thus forming an image. A laser beam required to obtain a BD signal during image formation is emitted in stable cycle time because the polygon mirror stably rotates during image formation. Hence, it is a common practice to emit a laser beam in a non-image area at a stage preceding the cycle time during which a BD signal is expected to be obtained.

As a deflecting means for deflecting a light beam from a light source, a galvano mirror which swings a deflective reflection surface is proposed. In recent years, there is also proposed a so-called micromirror which executes sine wave vibration by a resonant structure using a micromachining technology. These proposals are expected to miniaturize optical scanning devices and greatly reduce banding due to vibration, temperature rise, noise, and power consumption.

Moreover, in optical scanning for executing multibeam type reciprocal scanning, Japanese Patent Laid-Open No. 2002-311358 makes it possible to eliminate overlaps of scanning lines and reduce variation of the image height between the scanning line intervals on the surface of a photosensitive member.

Unfortunately, laser reciprocal scanning using a movable mirror raises the following problem. In general, a scanning line written on the electrostatic surface in the main scanning direction upon rotation of the photosensitive member inclines in the sub-scanning direction, though its amount is very small. The rotation speed of the photosensitive member is much lower than the main scanning speed, so the inclination of the scanning line becomes very small. However, when reciprocal scanning is done, the inclination of a scanning line reverses in every scanning. This means that scanning lines are written in zigzags on the surface of the photosensitive member. That is, variation of the image height between the scanning line intervals occurs, in which the interval of a scanning line written on the surface of the photosensitive member changes depending on the image height at a light spot, resulting in an uneven density or degradation in resolution.

SUMMARY OF THE INVENTION

An object of the present invention is to provide an image forming apparatus which prevents any uneven density and degradation in resolution in reciprocal laser scanning using a movable mirror.

To solve the above problem, according to the present invention, there is provided an image forming apparatus which forms an image on a photosensitive member by scanning the photosensitive member with a laser beam reflected by a movable mirror with reciprocating the movable mirror whose rotation angle is changeable in accordance with an electrical signal, comprising rotation direction detecting means for detecting a rotation direction of the movable mirror, and image correction means for weighting, on the basis of the rotation direction (CCW/CW) detected by the rotation direction detecting means, image data of two lines along a sub-scanning direction in correspondence with a scanning length after start of laser scanning for a line of laser scanning to compensate the image to be formed using the movable mirror.

According to the present invention, there is provided a method of controlling an image forming apparatus which forms an image on a photosensitive member by scanning the photosensitive member with a laser beam reflected by a movable mirror with reciprocating the movable mirror whose rotation angle is changeable in accordance with an electrical signal, comprising the steps of calculating a weighting coefficient required to weight image data of every line in a sub-scanning direction on the basis of a rotation speed of the movable mirror, a rotation direction of the movable mirror, and an elapsed time measured by a timer; and correction, by the weighting coefficient, the image to be formed using the movable mirror.

As described above, according to the present invention, in laser reciprocal scanning using a movable mirror, image data of two adjacent lines along the sub-scanning direction are weighted so as to prevent any uneven density and degradation in resolution even when scanning lines are written in zigzags on the surface of the photosensitive member.

Since the present invention adopts a deflecting means for executing reciprocal scanning, the use of a miniaturized micromirror is enabled. The present invention also achieves high-speed write without any high-speed vibration for reciprocal scanning, thus greatly reducing banding due to vibration, a temperature rise, noise, and power consumption.

Further features of the present invention will become apparent from the following description of exemplary embodiments with reference to the attached drawings.

BRIEF DESCRIPTION OF THE DRAWINGS

FIG. 5 is a timing chart showing an example of image PWM signal generation by a modulating unit according to the embodiment;

FIG. 6A is a block diagram showing an arrangement example of a movable mirror driving motor control unit according to the embodiment;

FIG. 9 is a view exemplifying scanning with respect to a photosensitive member and two-line weighting in the sub-scanning direction;

DESCRIPTION OF THE EMBODIMENTS

An embodiment according to the present invention will be described below with reference to the accompanying drawings.

Structure Example of Image Forming Apparatus According to Embodiment

Figure 1:
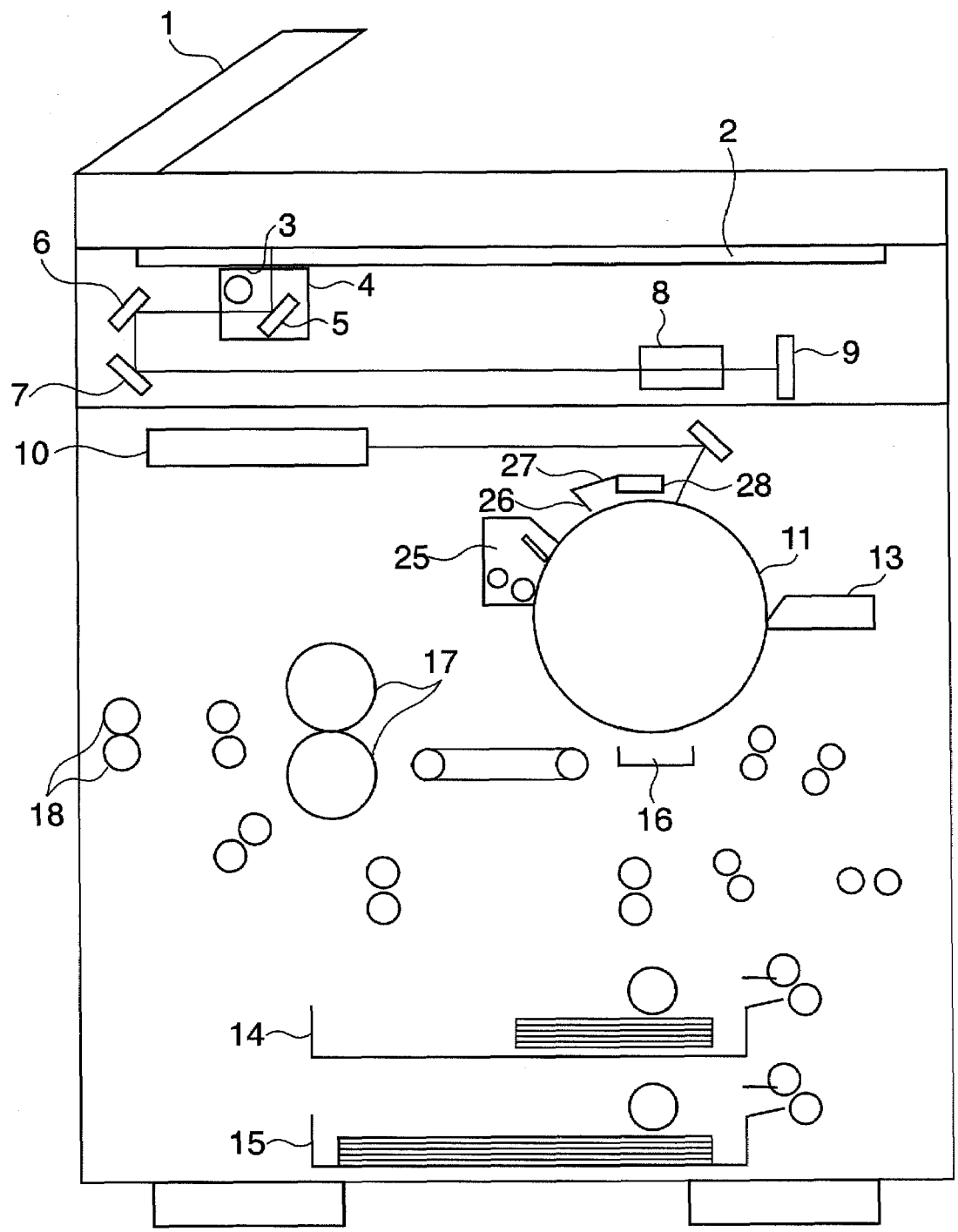
FIG. 1 is a sectional view showing a structure example of an image forming apparatus according to the embodiment.

FIG. 1 is a sectional view showing an example of the overall image forming apparatus to which the present invention is applied. The basic operations will be described with reference to FIG. 1.

Originals stacked on an document feeder 1 are sequentially conveyed onto the surface of an original glass table 2 one by one. When an original is conveyed, a lamp 3 at a scanner section is turned on and a scanner unit 4 so moves as to irradiate the original. The light reflected by the original passes through a lens 8 via mirrors 5, 6, and 7, and is then input to an image sensor unit 9. The image signal input to the image sensor unit 9 is directly or temporarily stored in an image memory (not shown). After being read out again, that image signal is input to an exposure control unit 10.

An electrostatic medium 11 is irradiated with light emitted by the exposure control unit 10 to form a desired latent image on it. The resultant image is developed by a developing unit 13. A transfer member is conveyed from a transfer member stacking unit 14 or 15 while synchronizing its timing with the above latent image formation. The above developed toner image is transferred onto the transfer member by a transfer unit 16. The transferred toner image is fixed to the transfer member by a fixing unit 17, and then the transfer member is discharged outside the apparatus by a sheet discharge unit 18. The surface of the electrostatic medium 11 after transfer is cleaned by a cleaner 25. The surface of the electrostatic medium 11, which has been cleaned by the cleaner 25, is charge-removed by an auxiliary charger 26 so as to obtain good charges in a primary charger 28. Any residual charges on the electrostatic medium 11 are eliminated by a pre-exposure lamp 27. The surface of the electrostatic medium 11 is charged by the primary charger 28. These processes are repeated to form images on a plurality of sheets.

Arrangement Example of Exposure Control Unit 10

Figure 2:
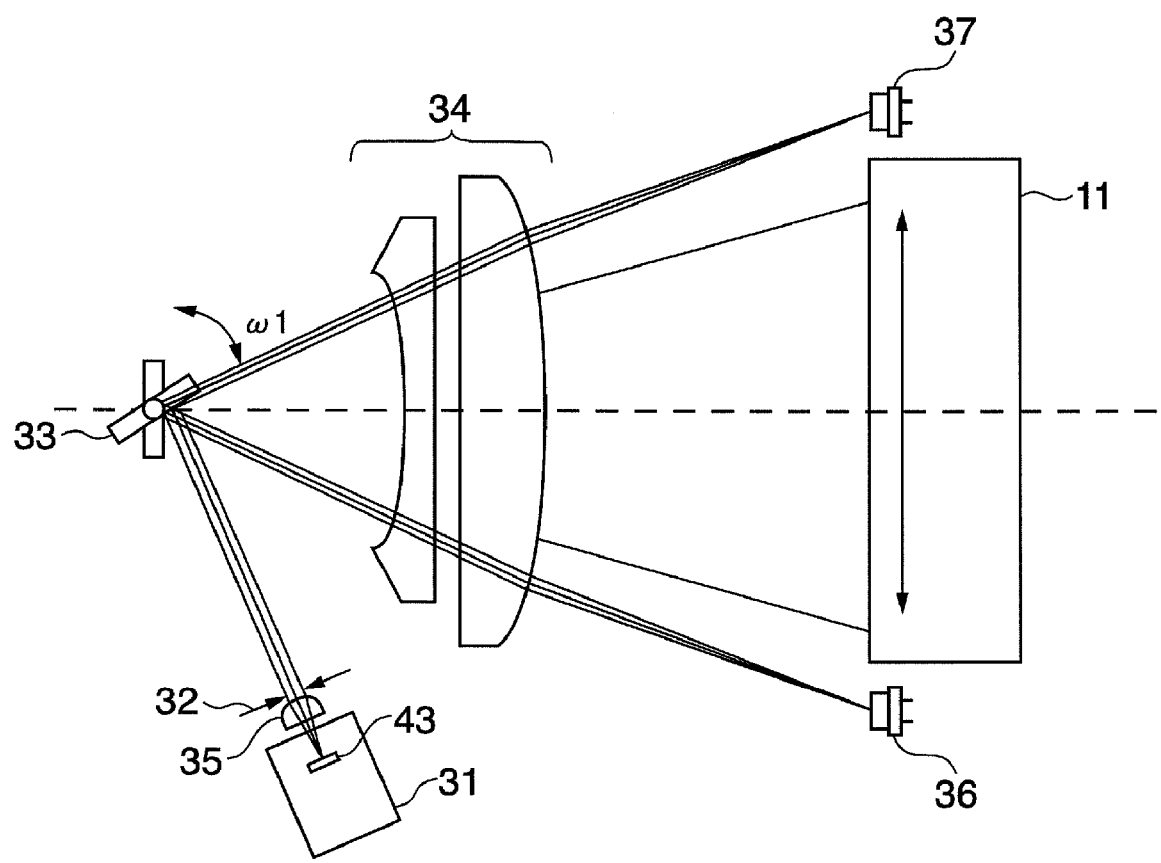
FIG. 2 is a view showing a structure example of an exposure control unit in the image forming apparatus according to the embodiment.

FIG. 2 is a view showing a structure example of the exposure control unit 10.

Referring to FIG. 2, reference numeral 31 denotes a laser driving unit; and 43, a semiconductor laser. A PD sensor to partially detect a laser beam is arranged inside the semiconductor laser 43, and executes APC for a laser diode using a detection signal from a PD. The laser beam emitted by the laser 43 is collimated into an almost parallel beam by a collimator lens 35 and stop 32, and strikes a movable mirror 33 with a predetermined beam diameter. The movable mirror 33 reciprocally rotates in the direction of an arrow at a constant angular speed $\omega 1$. Along with the reciprocal rotation, the incident light beam is reflected upon being formed into deflected beams which continuously change their deflection angles. The deflected light beams are condensed by an f-θ lens 34. Simultaneously, to allow the f-θ lens 34 to correct distorted aberration so as to assure the scanning to be linear for time, the light beams are combined and sequentially scanned on the electrostatic medium 11 as an image carrier at a constant speed in the direction of an arrow in FIG. 2. A beam detecting (to be referred to as BD hereinafter) sensor 1 36 detects light reflected by the movable mirror 33. A detection signal from the BD sensor 1 36 is used as a sync signal to synchronize rotation of the movable mirror 33 with data write. Since the movable mirror 33 is allowed to move by reciprocal scanning, sync signals to synchronize data write need to be detected at least at two points. Therefore, a BD sensor 2 37 also needs to be disposed.

Conventionally, to hold the amount of laser beam for one scanning constant, a laser driving circuit of an image forming apparatus of this type has adopted a method of detecting a laser beam output at a light detection interval for one scanning and holding a laser driving current during one scanning.

Arrangement and Operation Examples of Laser Driving Circuit

A laser driving current control method will be concretely described below with reference to FIG. 3.

Figure 3:
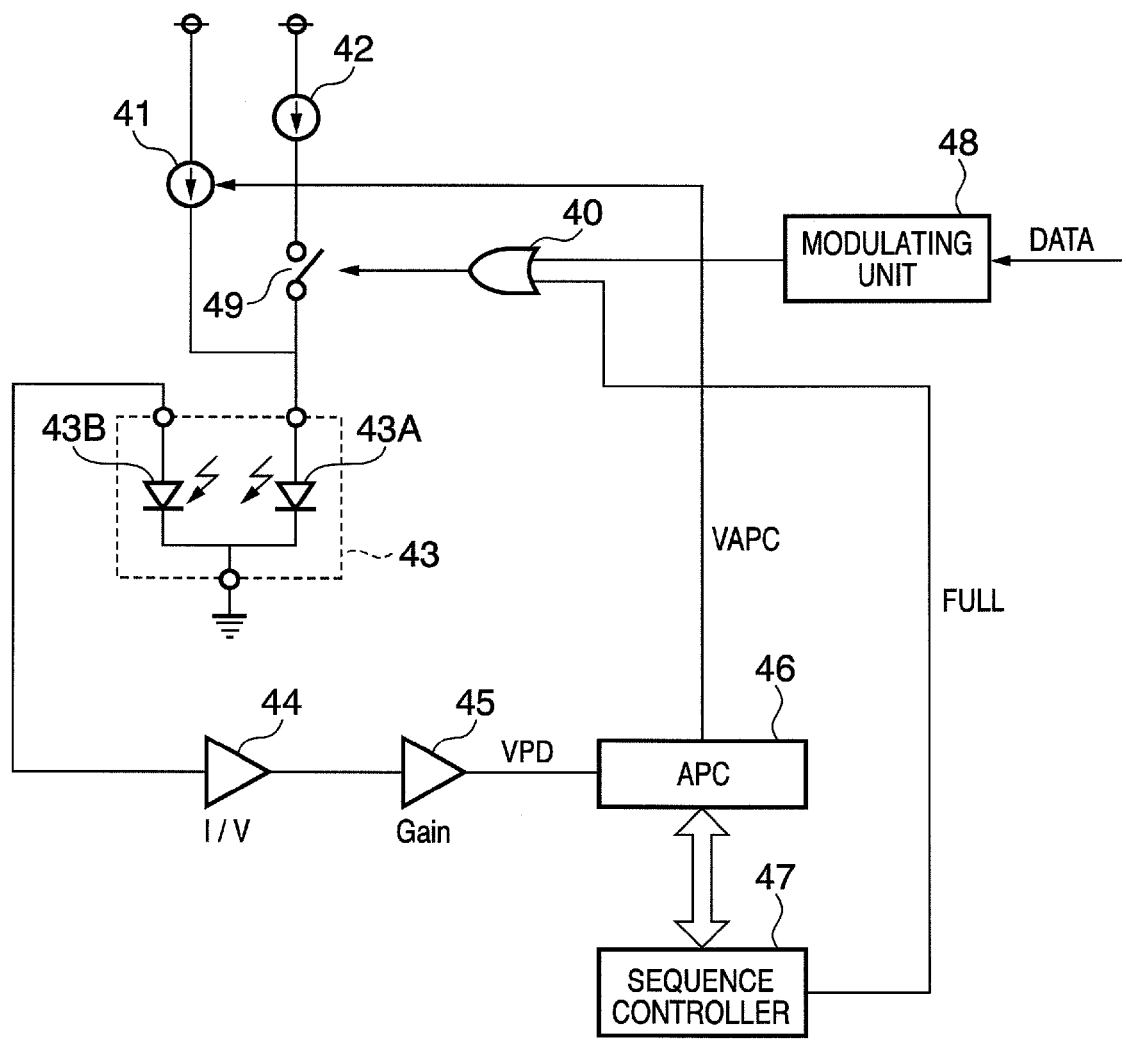
FIG. 3 is a circuit diagram showing an arrangement example of a laser control circuit according to the embodiment.

As shown in FIG. 3, an image forming apparatus of this type uses a laser chip 43 which comprises one laser 43A and one photodiode (to be referred to as a PD hereinafter) sensor 43B. It is being attempted to apply two current sources, i.e., a bias current source 41 and pulse current source 42 to the laser chip 43, thereby improving the light emission characteristic of the laser 43A. In order to stabilize the light emission of the laser 43A, an output signal from the PD sensor 43B is fed back to the bias current source 41 so as to automatically control the bias current amount. That is, a logic element 40 outputs an ON signal to a switch 49 in response to a full ON signal from a sequence controller 47 so that the sum total of the currents from the bias current source 41 and pulse current source 42 is supplied to the laser chip 43. The signal output from the PD sensor 43B at that time is input to a current/voltage converter 44, amplified by an amplifier 45, and input to an APC circuit 46. The resultant signal is supplied, as a control signal, to the bias current source 41 from the APC circuit 46.

This circuit system is called an APC (an abbreviation for Auto Power Control) circuit system that is popular as a laser driving circuit system at present. A laser beam exhibits a temperature characteristic in which the higher the temperature, the larger the current amount required to obtain a constant light amount. Also, since the laser heats up itself, simply supplying a constant current is insufficient to obtain a constant light amount. These factors have a great influence on image formation. To solve these problems, the amount of current to be supplied for every scanning is controlled using the above-described APC circuit system for every scanning so as to keep the light emission characteristic for every scanning constant. By turning on/off the switch 49, an image is formed from data obtained by causing a pixel modulating unit 48 to modulate the laser beam whose amount is thus controlled to be constant.

Arrangement Example of Modulating Unit 48

Figure 4:
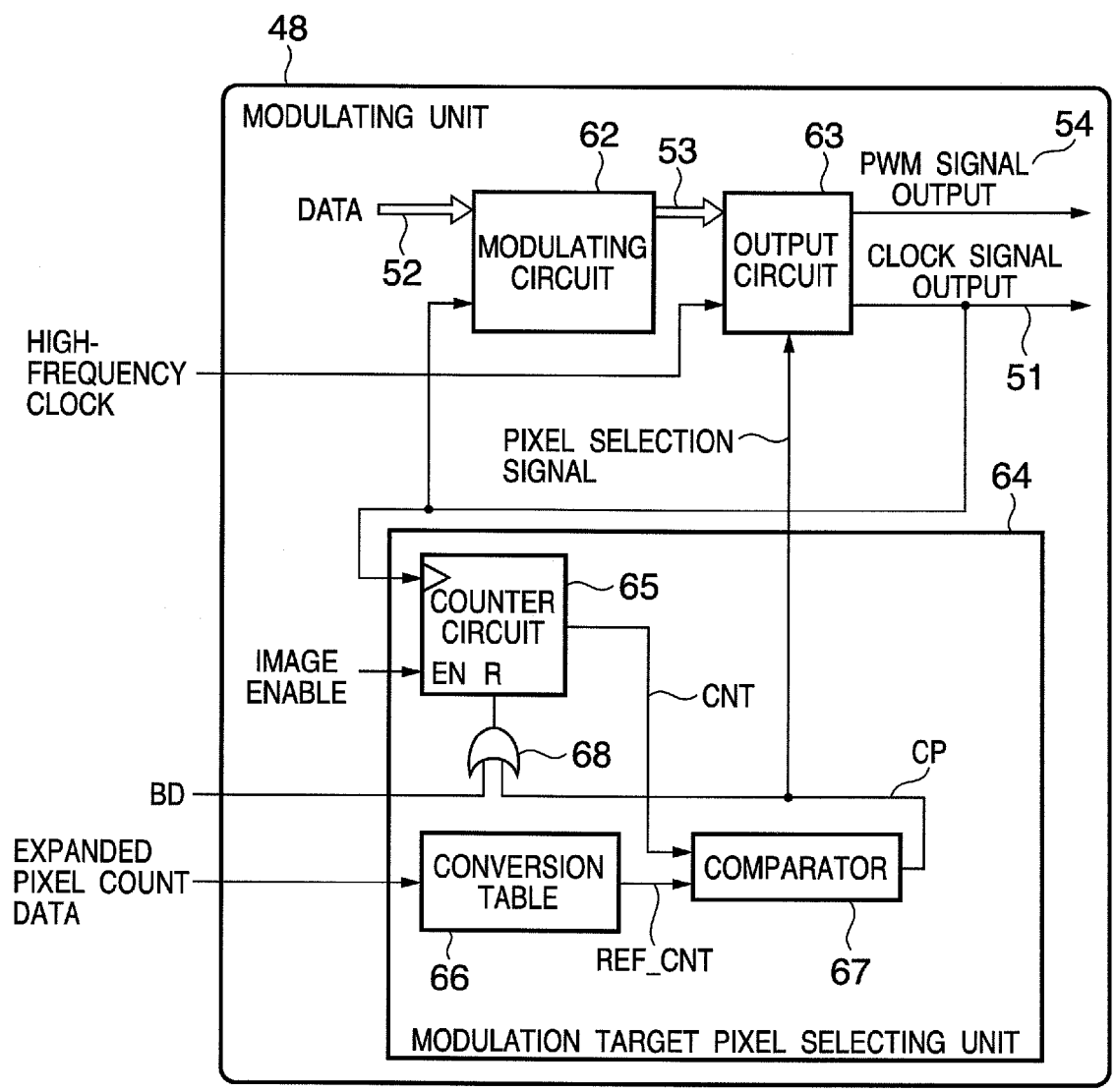
FIG. 4 is a block diagram showing control in the main scanning direction according to the embodiment.

FIG. 4 is a block diagram showing an arrangement example of the modulating unit 48 in FIG. 3.

Referring to FIG. 4, a high-frequency clock to be input to an output circuit 63 of a pixel selecting unit 64 is output from a PPL circuit (not shown). That clock has a frequency N times that of the fundamental clock. A modulating circuit 62 modulates image input data (DATA). To express the tonality of a laser beam, the ON time within the unit time is often controlled by PWM modulation. Hence, PWM modulation (in particular, digital PWM modulation) will be described here.

For example, to PWM-modulate A-bit input data, it is converted into a 2-A bit pulse width signal. At this time, a constant involved is determined to satisfy 2A=n. The modulating circuit 62 generates a pulse width signal from input data and transmits that signal to the output circuit 63. In accordance with the pulse width signal obtained by the modulating circuit 62, the output circuit 63 outputs an image PWM signal and image clock signal, both synchronized with the high-frequency clock output from the PLL circuit. The image PWM signal and image clock signal are transmitted to the laser driving circuit and an image processing unit, respectively.

FIG. 5 shows an example of image PWM signal generation by the modulating unit 48. FIG. 5 shows the following state. As image input data (DATA) 52, 3-bit data is input to the modulating circuit 62. The resultant data is output as 8-bit pulse width data 53. An image PWM signal 54 is output from the output circuit 63 on the basis of the pulse width data 53.

The basic operations of the movable mirror 33 will be described next with reference to FIGS. 2 and 6A.

A motor (not shown) allows the movable mirror 33 to reciprocally rotate at a predetermined rotation speed (angular speed $\omega 1$). A driving method need not always adopt motor driving and may adopt driving by static-electricity or driving by electromagnetic force. The operations of that motor includes comparing the cycle times of BD signals with a reference cycle time. The BD signals are detected alternately by the BD sensor 36 and BD sensor 37 for every line. The reference cycle time is generated by a reference cycle time generating unit 83. To match the resultant cycle time with the target cycle time, an calculation unit 81 controls to stably rotate the motor by outputting an acceleration/deceleration signal.

Figure 7:
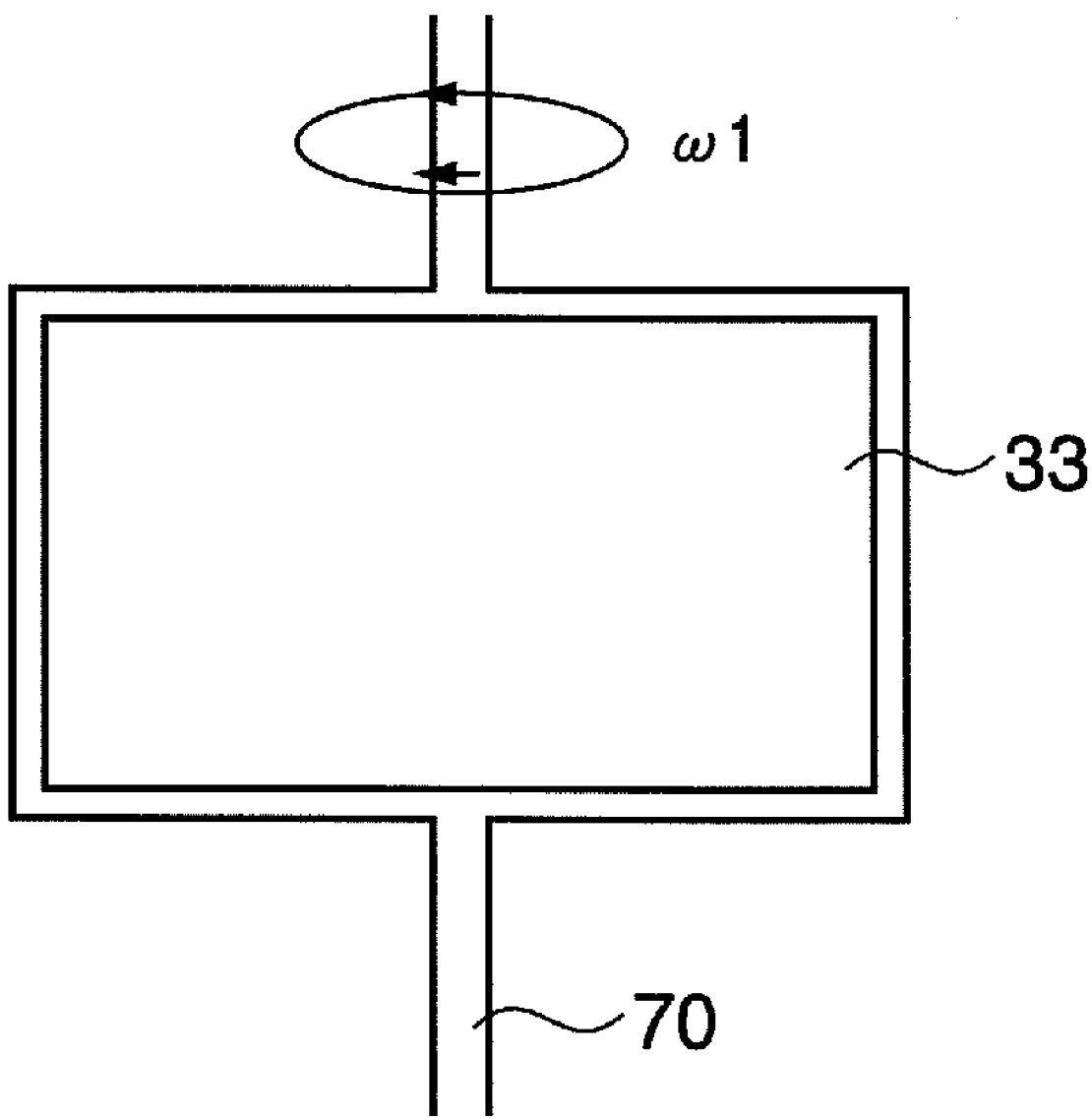
FIG. 7 is a view showing a structure example of a movable mirror according to the embodiment.

The structure of the movable mirror 33 will be described here with reference to FIG. 7. The movable mirror 33 reciprocally pivots about a mirror hinge (the central axis of the mirror) 70 as the center. Recently, the movable mirror which is integrally molded without driving shaft has been developed.

An image compensation method according to the embodiment will be described next with reference to FIG. 8.

Figure 8:
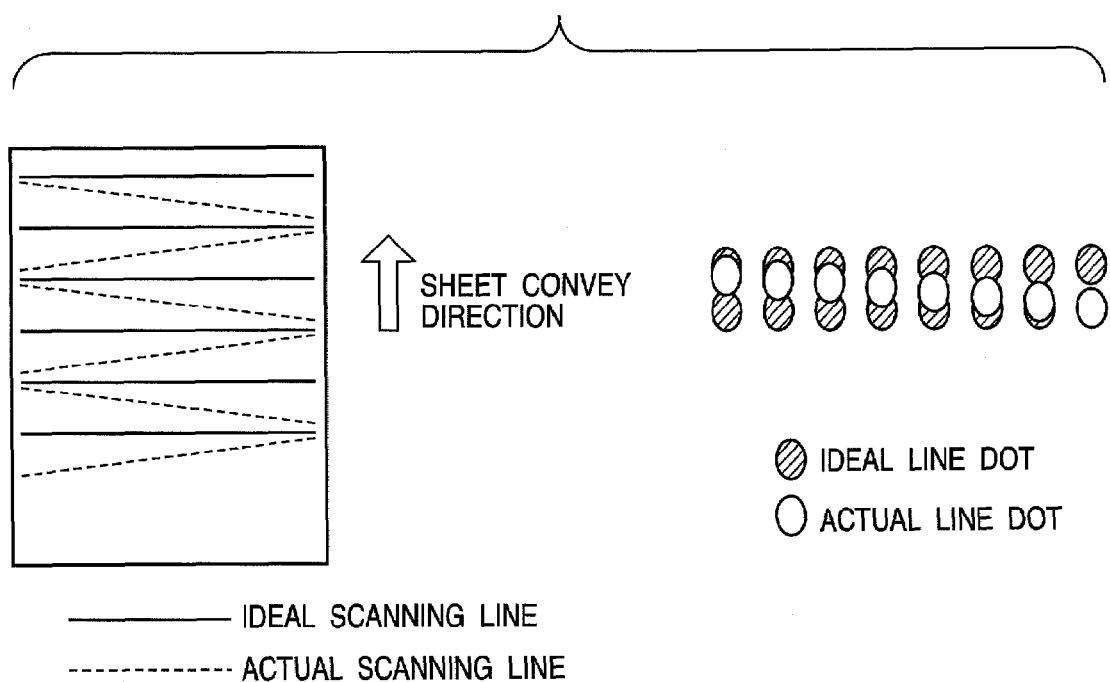
FIG. 8 is a view showing an image compensation method according to the embodiment.

When the electrostatic medium 11 is reciprocally scanned with a laser beam using the movable mirror 33, and scanning lines on its surface are two-dimensionally expanded, image data shifts in a direction reverse to the convey direction from the edge portion as indicated by dotted lines in FIG. 8. It is natural that the scanning lines slightly incline because the electrostatic medium 11 rotates. Since laser scanning by a conventional polyhedral scheme using a polygon mirror adopts one-directional scanning instead of reciprocal scanning, all the scanning lines are uniformly inclined irrespective of the degree of inclination. Furthermore, since the laser scanning speed is sufficiently higher than the rotation speed of the electrostatic medium 11, the inclination of the scanning lines is visually negligible. However, in reciprocal scanning like in this embodiment, the data may exhibit remarkable density variations because the scanning direction is reversed for every line, resulting in an image failure.

To solve this problem, two adjacent data along the sub-scanning direction are weighted for every line on the basis of the elapsed time and the rotational moving length of the electrostatic medium 11. An image data weight calculating unit 86 in FIG. 6A weights data generated by an image data generating unit 85.

Arrangement Example of Image Data Weight Calculating Unit 86

Figure 6B:
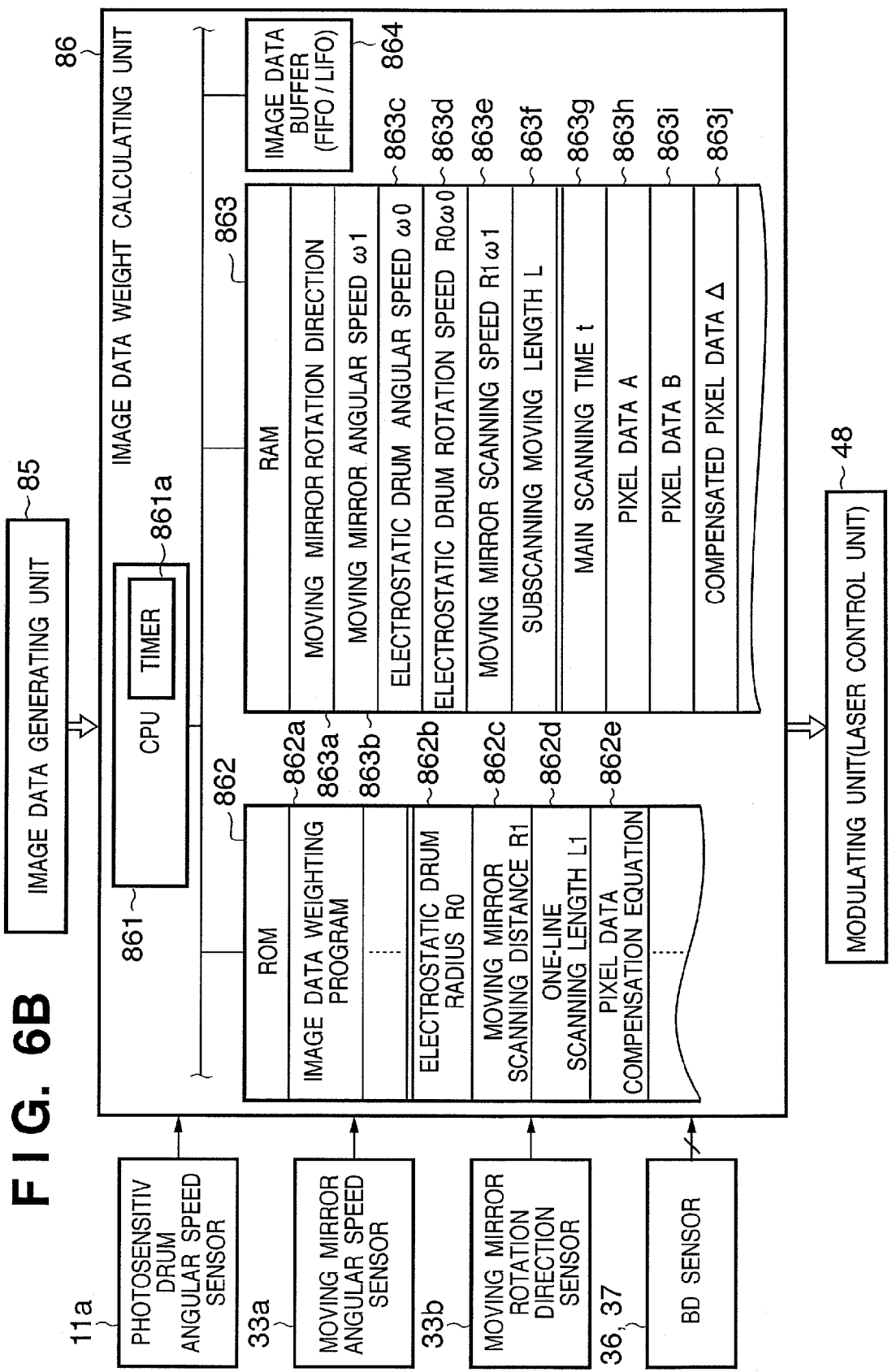
FIG. 6B is a block diagram showing a detailed arrangement example of an image data weight calculating unit 86 in FIG. 6A.

FIG. 6B is a block diagram showing an arrangement example in which the image data weight calculating unit 86 is implemented by a microcomputer. The same reference numerals as in other drawings denote the same functional components in FIG. 6B. As shown in FIG. 6B, the image data weight calculating unit 86 may be implemented by either software or hardware.

Referring to FIG. 6B, the image data weight calculating unit 86 comprises a CPU 861 which is used for arithmetic control and has a timer 861*a* to measure time. The image data weight calculating unit 86 further comprises a program 862*a*, fixed parameters, and ROM 862. The program 862*a* indicates the image data weight calculation procedure. The fixed parameters serve as constituent components necessary for image data weight calculation. The ROM 862 stores an equation. The fixed parameters include a radius R0 of the electrostatic medium 11, a scanning distance R1 from the movable mirror 33 to the surface of the electrostatic medium 11, and a one-line scanning length L1 between the BD sensors 36 and 37. As the equation, the following image data compensation equation is stored.

The image data weight calculating unit 86 still further comprises a RAM 863 which temporarily stores data necessary to cause the CPU 861 to execute the image data weight calculation program 862*a*. The RAM 863 comprises areas 863*a* to 863*j*. The area 863*a* stores the rotation direction of the movable mirror 33 detected by a movable mirror rotation direction sensor 33*b*. The area 863*b* stores an angular speed $\omega 1$ of the movable mirror 33 measured by a movable mirror angular speed sensor 33*a*. The area 863*c* stores an angular speed $\omega 0$ of the electrostatic medium 11 measured by a photosensitive member angular speed sensor 11*a*. The area 863*d* stores a rotation speed R0×$\omega 0$ of the electrostatic medium 11 calculated from the radius R0 and angular speed $\omega 0$ of the electrostatic medium 11. The area 863*e* stores a scanning speed R1×$\omega 1$ of the movable mirror 33 calculated from the scanning distance R1 and angular speed $\omega 1$ of the movable mirror 33. The area 863*f* stores a moving length L in the sub-scanning direction during the time from the start of write to the end of write for one line with respect to the surface of the electrostatic medium 11. The area 863*g* stores a main scanning time t from the start of write for one line measured by the timer 861*a*. The area 863*h* stores pixel data A of a line two lines before the current line along the sub-scanning direction. The area 863i stores pixel data B of a line two lines before the current line along the sub-scanning direction. The area 863j stores compensated pixel data Δ calculated from the above numerical values in accordance with an image data compensation equation 862e.

The image data weight calculating unit 86 still further comprises an image data buffer 864 which buffers, using FIFO or LIFO in correspondence with a movable mirror rotation direction 863a, data of at least two lines along the sub-scanning direction out of image data generated by the image data generating unit 85.

The compensated pixel data Δ (863j) as the weight calculation result obtained by the image data weight calculating unit 86 is output to the modulating unit 48.

Assignment to the ROM 862, RAM 863, and image data buffer 864 in FIG. 6B is merely an example, and is not limited to this.

Operation Example of Image Forming Apparatus According to Embodiment (Data Weighting Method)

A data weighting method will be described below with reference to FIG. 9. The data weighting method is implemented by the arrangement example in FIG. 6B.

Referring to FIG. 9, let A and B be pixel data of ideal two data along the sub-scanning direction that become adjacent after the elapse of the time t since the start of data write, and α(t) be a weighting coefficient as a function of the elapsed time.

Actually written pixel data Δ(t) in consideration of a shift length in the sub-scanning direction when the electrostatic medium 11 actually rotates is given by:

$$\Delta(t) = A \times (1 - \alpha(t)) + B \times \alpha(t)$$

where α(t) represents an almost straight line as a function of the time t. The slope of α(t) is given as a value obtained by dividing the moving length of the drum per unit time by the scanning length in the main scanning direction per unit time. That is, letting t0 be the scanning time for one line, weighting for data of line 1 is greater immediately after the start of data write, but weighting for data of line 2 becomes greater as the time t approaches the time t0.

As a weighting method different from that described above, as shown in FIG. 9, the radius and angular speed of the electrostatic medium 11 are set to R0 and ω0, respectively, and the length between lines is set to L0. Also, the time from the start of data write is set to t (0≦t≦t0, where t0 is the time until the end of write for one line). Pixel data of ideal two data along the sub-scanning direction that become adjacent after the elapse of the time t since the start of data write are set to A and B.

Letting Δ be actually written pixel data in consideration of a shift length in the sub-scanning direction when the electrostatic medium 11 actually rotates, image data is so compensated as to satisfy:

$$\Delta = A \times (L0 - R0\omega0 t)/L0 + B \times R0\omega0 t/L0$$

However, this applies to a case wherein the write start position of the image coincides with that of the first data of the first line, and the write end position coincides with that of the last data of the second line.

In general, therefore, letting L be the moving length in the sub-scanning direction during the time from the start of data write to the end of data write, pixel data is compensated by the scanning speed of the mirror and the rotation speed of the electrostatic medium 11 so as to satisfy:

$$\Delta = A \times (L - R0\omega0 t)/L + B \times R0\omega0 t/L$$

The data write method in this case is executed by a FIFO (which allows data read in the forward direction to be output in the forward direction) scheme. In order to control the timing of starting to write data, control to start a write operation after the elapse of a predetermined time since a laser beam was detected by the BD sensor 36 (37) is done.

Operations for writing data of the second and third lines are similarly controlled to start after the elapse of a predetermined time since a laser beam was detected by the BD sensor 37 (36). A timer (not shown) is controlled to start simultaneously with the start of write. The data write method in this case is executed by an LIFO (which allows data read in the forward direction to be output in the reverse direction) scheme. Outputting of data is controlled to be done by alternately using the FIFO and LIFO schemes for every line. Outputting of data using the FIFO and LIFO schemes is controlled by the mirror rotation direction and the laser scanning direction. Note that reciprocal scanning with a laser beam needs to be done until a laser beam is detected by the BD sensor after the end of the write operation. When the laser beam is detected by the BD sensor, the next timing of starting to write data is determined. The moving length in the main scanning direction is a function of the angular speed ω1 of the movable mirror 33.

That is, the image data weight calculating unit 86 in FIG. 6B always reads image data of two lines and executes the weighting interpolation calculation. The calculated image data are output by alternately using the FIFO and LIFO schemes for every line. Weighting interpolation of the image data weight calculating unit 86 may be implemented by either hardware or software.

Explanation of Timing Chart at the Time of Reciprocal Scanning

Figure 10:
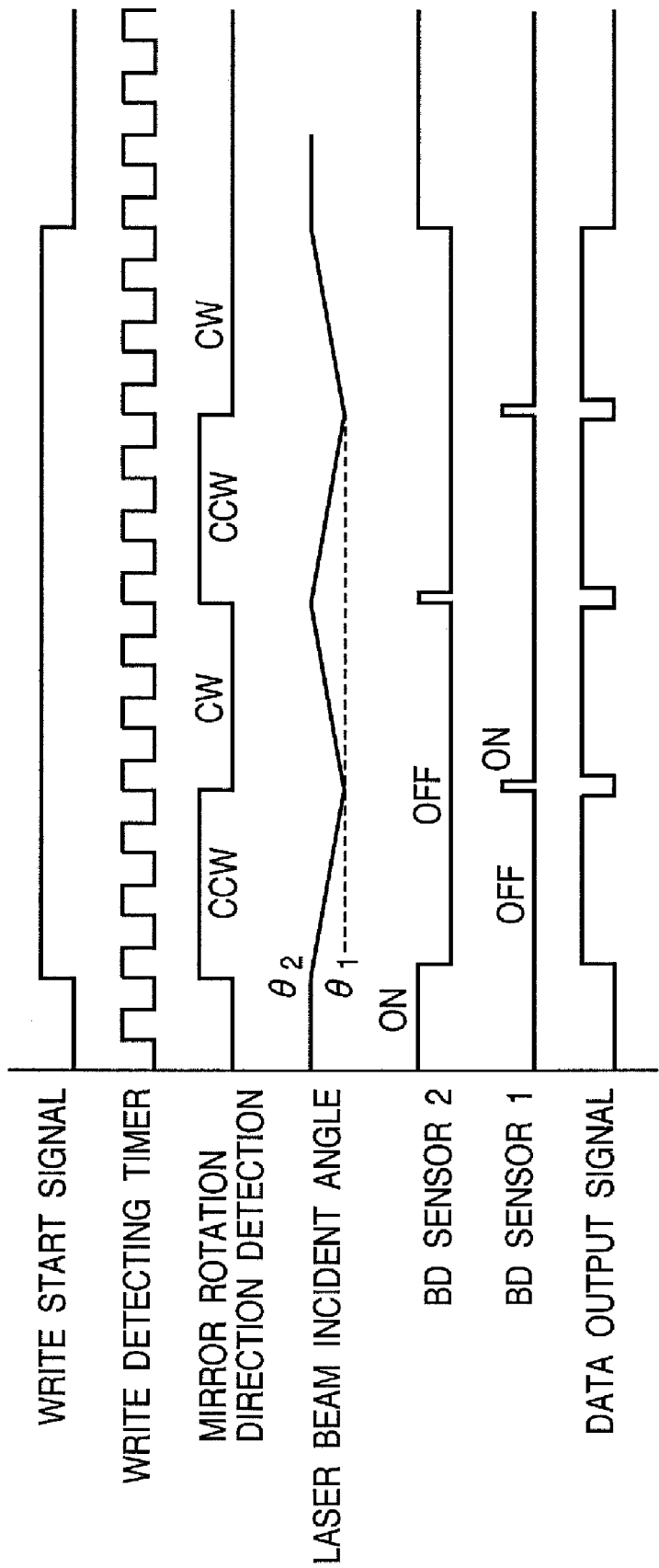
FIG. 10 is a timing chart showing an image data output at the time of reciprocal scanning according to the embodiment.

Reciprocal scanning using the movable mirror 33 according to this embodiment will be explained below with reference to the timing chart in FIG. 10.

When a laser write signal is turned on, the movable mirror 33 starts a pivot operation such that it escapes from a movable mirror HP sensor (not shown). The BD sensor 36 (37) may also serve as the movable mirror HP sensor. At this time, the rotation direction of the movable mirror 33 can be detected by its rotation direction detecting means. When the movable mirror 33 pivots and the BD sensor 1 36 detects a laser beam, control to start writing data on the electrostatic medium 11 after the elapse of a predetermined time since laser beam detection is done. The time from when the BD sensor 1 36 detects a laser beam to the start of data write is controlled using a timer.

As described above, data to be output here is made to take a form of pixel data obtained by weighting, in correspondence with positions in the main scanning direction, two pixels of two adjacent lines along the sub-scanning direction. The output type of data in this case is determined on the basis of the rotation direction of the movable mirror 33. For example, in case of FIG. 10, control to output data by the FIFO scheme if the rotation direction of the movable mirror 33 is CCW and by the LIFO scheme if the rotation direction of the movable mirror 33 is CW is done. The correspondence between the rotation direction of the movable mirror 33 and the output type of data is reversible.

When data write of the first line is complete, control to rotate the movable mirror 33 in the reverse direction, i.e., the CW direction in this case is triggered by laser beam detection. Control to start writing data of the second line on the electrostatic medium 11 after the elapse of a predetermined time since the BD sensor 2 detected a laser beam is done. The output type of data in this case is so controlled as to output data by a scheme different from the first line, i.e., the LIFO scheme. By repeating the above operations, write of image data of one sheet is completed. The laser write signal is then turned off.

Note that the rotation speed of the movable mirror 33 is controlled to a constant angular speed. The angular speed $\omega 1$ of the movable mirror 33 is set to a value sufficiently higher than the angular speed $\omega 0$ of the electrostatic medium 11.

Figure 12:
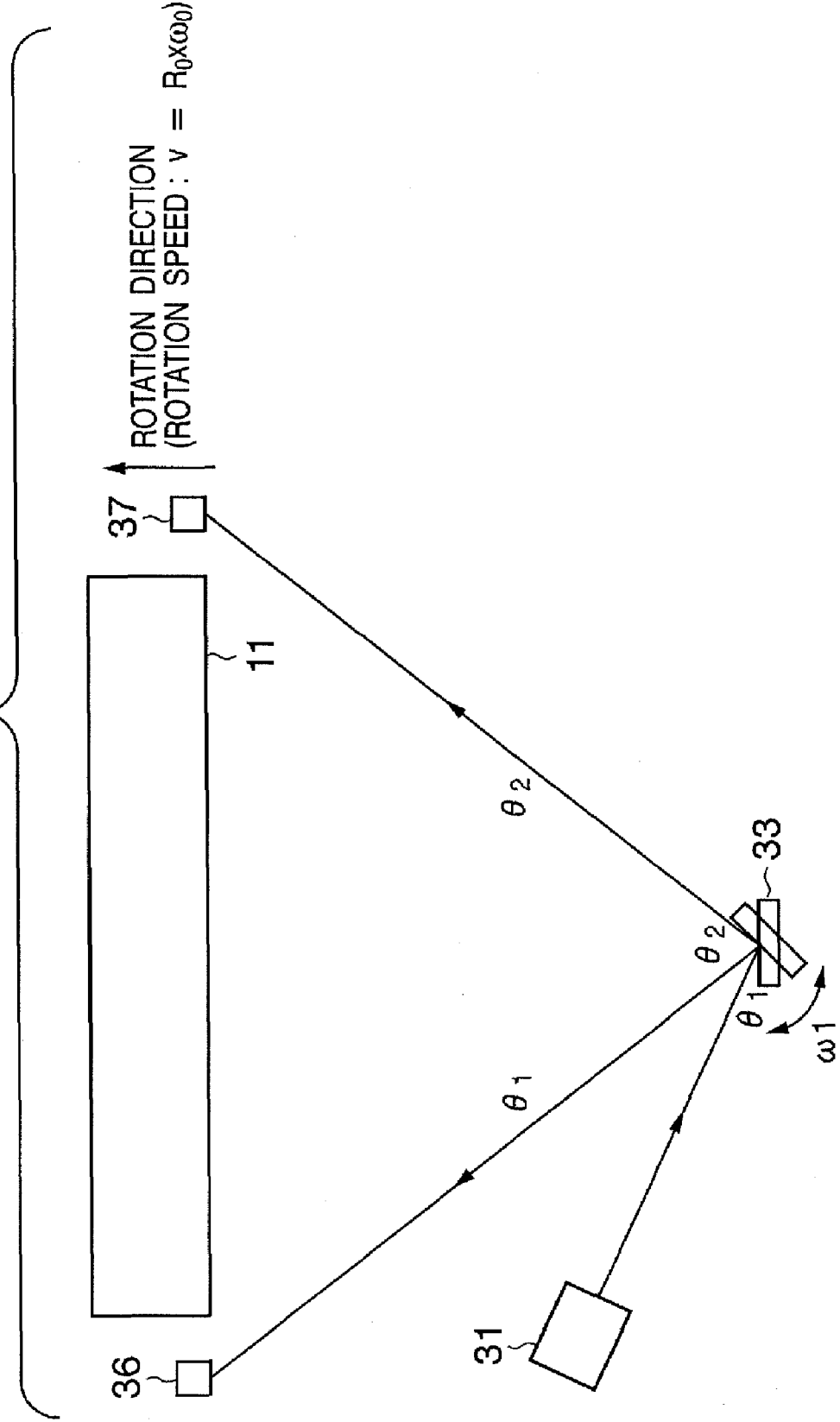
FIG. 12 is a view showing the incident angle of a laser beam with respect to the movable mirror according to the embodiment.

As shown in FIG. 12, an incident angle $\theta$ of a laser beam with respect to the movable mirror 33 falls within the range $\theta 1 \leq \theta \leq \theta 2$. $\theta 1$ represents the incident angle of a beam with respect to the movable mirror 33 when the BD sensor 1 36 detects it, and $\theta 2$ represents the incident angle of a beam with respect to the movable mirror 33 when the BD sensor 2 37 detects it.

Example of Output Data Processing Procedure at the Time of Reciprocal Scanning

Figure 11:
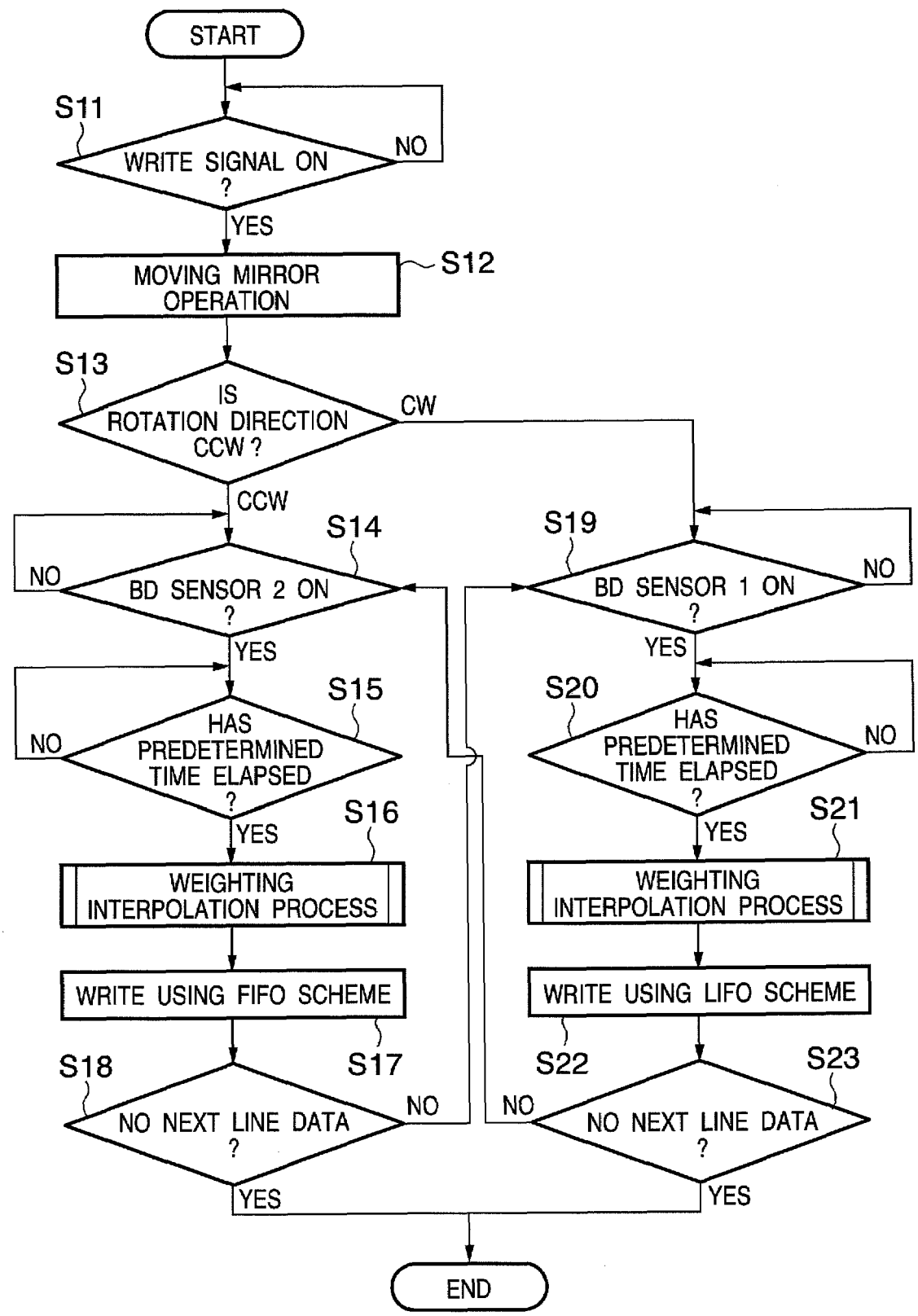
FIG. 11 is a flowchart showing an image data output at the time of reciprocal scanning according to the embodiment.

The output data processing procedure at the time of reciprocal scanning using the movable mirror 33 according to this embodiment will be described next with reference to the flowchart in FIG. 11. The flowchart in FIG. 11 corresponds to the image data weighting program 862a executed by the CPU 861 in FIG. 6B.

When a laser scanning write signal is turned on (S11), the movable mirror 33 starts to operate in the scanning direction of the electrostatic medium 11 (S12). If the rotation direction of the movable mirror 33 is the CCW direction (S13), image data having undergone a weighting interpolation process (S16) is allowed to be written at the write start position a predetermined period of time (S15) after the BD sensor 2 37 detected a beam (S14). In this case, the type of image data output from the image write start position is controlled to the FIFO scheme (S17).

If the rotation direction of the movable mirror 33 is the CW direction, image data having undergone a weighting interpolation process (S21) is allowed to be written at the write start position a predetermined period of time (S20) after the BD sensor 1 36 detected a beam (S19). In this case, the type of image data output from the image write start position is controlled to the LIFO scheme (S22). After the processing operations alternately using the FIFO and LIFO schemes for every line to output images are repeated (S18, S23), scanning of image data of the last line is completed. The laser scanning image write signal is then controlled to be turned off. In this case, the weighting interpolation processes in steps S16 and S21 can be implemented by the same subroutine.

The present invention may be applied to a system or integrated apparatus including a plurality of devices (e.g., a host computer, interface device, reader, and printer) or an apparatus including a single device.

The object of the present invention is achieved even by supplying a storage medium (or recording medium) which stores software program codes for implementing the functions of the above-described embodiment to the system or apparatus and causing the computer (or CPU or MPU) of the system or apparatus to read out and execute the program codes stored in the storage medium. In this case, the program codes read out from the storage medium implement the functions of the above-described embodiment by themselves, and the storage medium which stores the program codes constitutes the present invention. The functions of the above-described embodiment are implemented not only when the readout program codes are executed by the computer but also when the operating system (OS) running on the computer performs part or all of actual processing on the basis of the instructions of the program codes.

The functions of the above-described embodiment are also implemented when the program codes read out from the storage medium are written in the memory of a function expansion card inserted into the computer or a function expansion unit connected to the computer, and the CPU of the function expansion card or function expansion unit performs part or all of actual processing on the basis of the instructions of the program codes.

When the present invention is applied to the above storage medium, it stores a program code corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-252721, filed Aug. 31, 2005, which is hereby incorporated by reference herein in its entirety.

What is claimed is:

1. An image forming apparatus which forms an image on a photosensitive member by scanning the photosensitive member forward and backward in a main scanning direction with a laser beam reflected by a reciprocating movable mirror which reflects the laser beam emitted from a light source based on image data toward the photosensitive member, comprising:
   a rotation direction detecting unit adapted to detect a rotation direction of the movable mirror;
   a laser beam detecting unit adapted to detect the laser beam scanning the photosensitive member in the main scanning direction; and
   an image correction unit adapted to weight, on the basis of the rotation direction detected by said rotation direction detecting unit, image data of two lines along a sub-scanning direction in correspondence with a scanning length after start of laser scanning for a line of laser scanning to compensate the image to be formed using the movable mirror; correct the image data and output the corrected image data to said light source for control of its emission,
   wherein said image correction unit changes weighting coefficients in proportion to a scanning time after start of a line of forward or backward laser scanning in the main scanning direction, based on the rotation direction of the movable mirror detected by said rotation direction detecting unit and a detection of the laser beam by said laser beam detection unit, and generates the corrected image data for a line of forward or backward laser scanning in the main scanning direction by weighting image data of two lines neighboring in a sub-scanning direction orthogonal to the main scanning direction with the changed weighting coefficients to compensate the image to be formed using the movable mirror.

2. The apparatus according to claim 1, further comprising:
   a first rotation speed detecting unit adapted to detect a rotation speed of the photosensitive member;

a second rotation speed detecting unit adapted to detect an angular speed of the movable mirror; and a timer which measures the scanning time elapsed after start of forward or backward laser scanning based on the detection of the laser beam by said laser beam detection unit, wherein said image correction unit includes a weighting coefficient calculating unit adapted to calculate the weighting coefficients required to weight image data of every line in the sub-scanning direction based on the rotation speed of the photosensitive member, the rotation speed of the movable mirror, the rotation direction of the movable mirror, and the elapsed scanning time measured by said timer, and that the image to be formed using the movable mirror is compensated by the weighting coefficient.

3. The apparatus according to claim 1, wherein said laser beam detecting unit comprises at least two detecting units positioned at different locations and adapted to detect a laser beam to control a timing of starting to form an image by the forward or backward laser scanning.

4. The apparatus according to claim 1, wherein said image correction unit comprises data output type selecting unit adapted to select, in accordance with the rotation direction of the movable mirror, an output type of image data from an FIFO scheme which allows data read in a forward direction to be output in the forward direction and an LIFO scheme which allows data read in the forward direction to be output in a reverse direction.

* * * * *